(12) United States Patent
Hines et al.

(10) Patent No.: US 8,170,925 B1
(45) Date of Patent: May 1, 2012

(54) COMPUTER-IMPLEMENTED METHODS AND SYSTEMS FOR AUTOMATIC MERCHANDISING

(75) Inventors: Andrew Hines, Sunnyvale, CA (US); Arthur L. Norins, Sr., Cupertino, CA (US)

(73) Assignee: NOR1, Inc., Sunnyvale, CA (US)

( * ) Notice: Subject to any disclaimer, the term of this patent is extended or adjusted under 35 U.S.C. 154(b) by 0 days.

(21) Appl. No.: 13/184,916

(22) Filed: Jul. 18, 2011

(51) Int. Cl.
*G06Q 30/00* (2006.01)

(52) U.S. Cl. ............. 705/26.41; 705/14.5; 705/14.51; 705/14.52; 705/14.24; 705/14.14

(58) Field of Classification Search ............ 705/27, 705/26.1, 27.1, 26.41, 14.1
See application file for complete search history.

(56) References Cited

U.S. PATENT DOCUMENTS

| | | | |
|---|---|---|---|
| 5,740,323 A | 4/1998 | Nomura et al. | |
| 6,029,195 A | 2/2000 | Herz | |
| 6,453,315 B1 | 9/2002 | Weissman et al. | |
| 6,591,257 B1 | 7/2003 | Martinka et al. | |
| 6,839,680 B1 | 1/2005 | Liu et al. | |
| 6,934,748 B1 | 8/2005 | Louviere et al. | |
| 6,973,418 B1 | 12/2005 | Kirshenbaum | |
| 7,113,917 B2* | 9/2006 | Jacobi et al. | 705/14.53 |
| 7,149,121 B2 | 12/2006 | Lin et al. | |
| 7,433,879 B1* | 10/2008 | Sharma et al. | 1/1 |
| 7,584,215 B2 | 9/2009 | Saari et al. | |
| 7,698,170 B1* | 4/2010 | Darr et al. | 705/26.35 |
| 7,720,720 B1* | 5/2010 | Sharma et al. | 705/26.7 |
| 7,720,723 B2* | 5/2010 | Dicker et al. | 705/26.8 |
| 7,756,891 B2 | 7/2010 | Kimbrough et al. | |
| 7,809,740 B2 | 10/2010 | Chung et al. | |
| 7,836,001 B2* | 11/2010 | Ducheneaut et al. | 706/45 |
| 7,894,651 B2 | 2/2011 | Gutkowicz-Krusin et al. | |
| 7,899,764 B2 | 3/2011 | Martin et al. | |
| 7,966,219 B1* | 6/2011 | Singh et al. | 705/26.8 |
| 2003/0009456 A1* | 1/2003 | Shintani et al. | 707/6 |
| 2003/0217055 A1* | 11/2003 | Lee et al. | 707/6 |
| 2007/0094066 A1* | 4/2007 | Kumar et al. | 705/10 |
| 2009/0234710 A1* | 9/2009 | Belgaied Hassine et al. | 705/10 |
| 2011/0213648 A1* | 9/2011 | Mesaros | 705/14.19 |
| 2011/0225293 A1* | 9/2011 | Rathod | 709/224 |
| 2011/0264501 A1* | 10/2011 | Clyne | 705/14.25 |

OTHER PUBLICATIONS

Poonkulali, "Bidding for assets", dated Jun. 2002.*
Pr Newswire, "Haveneed selected for the venture watch television series—profile will air this week on Time Warner Cable's news 8 Austin", dated Jan. 14, 2002.*
Business Wire, Corporate profile for Visagent Corporation dated, Nov. 30, 2001.*
Draper, Electa, Technology lets investors trade anonymously Durango's OptiMark introduces system with impressive results, Dated Jan. 30, 1999.*

* cited by examiner

*Primary Examiner* — Mark Fadok
(74) *Attorney, Agent, or Firm* — Greenberg Traurig, LLP (57) ABSTRACT

One embodiment of the instant invention is a computer-implemented method for processing transaction-related data that includes at least the following steps of: receiving seller data about a seller; receiving buyer data about a buyer; generating a seller profile; generating a buyer profile; receiving transaction data about a current transaction between the seller and the buyer for an offering; generating a transaction composite for the current transaction; determining a classification rule for each transaction composite class; and classifying the transaction composite into a particular transaction composite class based on comparing the classification rule to: i) the generated seller profile, ii) the generated buyer profile, or iii) the current transaction.

22 Claims, 4 Drawing Sheets

COMPUTER-IMPLEMENTED METHODS AND SYSTEMS FOR AUTOMATIC MERCHANDISING

TECHNICAL FIELD

The present invention relates to computer-implemented methods and systems for dynamically aggregating and processing transactional data into data objects and generating individually customizable offers that can be optimized based, at least in part, on projected revenue.

BACKGROUND

Typically, buyers buy products and/or services that more appropriately fit theirs needs, wants, and financial abilities. Offerings and their prices are subject to numerous variables and are often made based on pure guesses.

SUMMARY OF INVENTION

In some embodiments, the instant invention includes a computer-implemented method for processing transaction-related data that includes at least the following steps of: receiving, by a computer system, seller data about at least one seller that at least include i) at least one seller qualitative characteristic about the at least one seller and at least one seller quantitative characteristic of the at least one seller, or ii) a plurality of seller qualitative characteristics about the at least one seller, or iii) a plurality of seller quantitative characteristics of the at least one seller; receiving, by the computer system, buyer data about at least one buyer that include i) at least one buyer qualitative characteristic about the at least one buyer and at least one buyer quantitative characteristic of the at least one buyer, or ii) a plurality of buyer qualitative characteristics about the at least one seller, or iii) a plurality of buyer quantitative characteristics of the at least one seller; generating, by the computer system, from the seller data, at least one seller profile for the at least one seller where the at least one seller profile comprising at least one seller statistical score calculated based at least in part on the at least one seller qualitative characteristic about the at least one seller or the at least one seller quantitative characteristic of the at least one seller, or both; generating, by the computer system, from the buyer data, at least one buyer profile for the at least one buyer where the at least one buyer profile comprising at least one buyer statistical score calculated based at least in part on the at least one buyer qualitative characteristic about the at least one buyer or the at least one buyer quantitative characteristic of the at least one buyer, or both; receiving, by the computer system, transaction data about at least one current transaction between the at least one seller and the at least one buyer for at least one first offering that includes i) at least one transaction qualitative characteristic about the at least one current transaction, or ii) at least one transaction quantitative characteristic of the at least one current transaction; generating, by the computer system, at least one transaction composite for the at least one current transaction based, at least in part, on: i) the generated particular seller profile, ii) the generated particular buyer profile, and iii) the at least one current transaction; determining, by the computer system, at least one classification rule for each transaction composite class, where each classification rule is determined based at least in part on a plurality of conditions, where the plurality of conditions include i) at least one of the following: the at least one seller qualitative characteristic, or the at least one seller quantitative characteristic, and the at least one seller statistical score, and ii) at least one of the following: the at least one buyer qualitative characteristic, the at least one buyer quantitative characteristic, and the at least one buyer statistical score, and iii) at least one of the following: the at least one transaction qualitative characteristic and the at least one transaction quantitative characteristic; and classifying, by the computer system, the at least one transaction composite into a particular transaction composite class based, at least in part, on comparing the at least one classification rule to: i) the generated at least one seller profile, ii) the generated at least one buyer profile, or iii) the at least one current transaction.

In some embodiments, the inventive methods further include a step of initiating at least one electronic request to at least one electronic source to obtain the seller data about the at least one seller. In some embodiments, the inventive methods further include a step of initiating at least one electronic request to at least one electronic source to obtain the buyer data about the at least one buyer. In some embodiments, the at least one electronic source is a social network source.

In some embodiments, the at least one seller and buyer statistical scores are of type selected from the group of: sum, average, median, mode and count. In some embodiments, the at least one classification rule is based, at least in part, on at least one data mining process. In some embodiments, the at least one data mining process selected from the group of: branching tree-process, clustering process, support vector machine process, neural network process, and random forest process.

In some embodiments, the buyer data comprising online browsing history or clickstream data. In some embodiments, the transaction data comprising information about one of at least one online transaction or at least one offline transaction.

In some embodiments, the instant invention includes a computer-implemented method for determining an offer that include at least the following steps of: determining, by a computer system, a demand for at least one offering from the at least one seller, where the demand is calculated based, at least in part, on: 1) at least one transaction composite, 2) at least one product preference function, where the at least one product preference function is based at least in part on: i) a plurality of offerings, ii) a price of each offering from the plurality of offerings, iii) a transaction composite class of the at least one transaction composite, where the at least one product preference function determines at least one ranked subset of offerings from the plurality of offerings, wherein the at least one ranked subset of offerings identifies a purchasing probability for each offering from the at least one ranked subset of offerings when each offering is being offered with at least one other offering from the at least one ranked subset of offerings, and wherein the at least one product preference function evaluates the purchasing probability of each offering from the at least one ranked subset of offerings based, at least in part, on at least one relationship between the price of each offering in the at least one ranked subset of offerings and the purchasing probability of each offering from the at least one ranked subset of offerings, and 3) at least one price sensitivity function, where the at least one price sensitivity function is based at least in part on: i) the at least one ranked subset from the plurality of offerings, ii) the price and the purchasing probability of each offering from at least one ranked subset, iii) the transaction composite class of the at least one transaction composite, where the at least one price sensitivity function determines the at least one relationship between the price of each offering from the at least one ranked subset of offerings and the purchasing probability of each offering from the at least one ranked subset of offerings; calculating, by the computer system, a supply prediction for the at least one offering, where the supply prediction is determined based at least in part on: i) historical demand data indicating previous fulfillment of the at least one offering, ii) current demand data indicating at least one received but unfulfilled order availability of the at least one offering, and iii) capacity limit for fulfilling orders for the at least one offering; calculating, by the computer system, a revenue prediction, where the revenue prediction determines a maximum expected revenue based at least on the determined demand for the at least one offering and the supply prediction for the at least one offering; and providing at least one offer to at least one potential buyer based, at least in part, on: (1) the determined demand for the at least one offering, (2) the calculated supply prediction, and (3) the calculated revenue prediction.

In some embodiments, the at least one offer comprising an offer of at least one of: merchandise or service. In some embodiments, the merchandise or the service is subject to uncertain availability.

In some embodiments, the instant invention includes a computer system for processing transaction-related data where the computer system includes at least the following components: a) memory having at least one region for storing computer executable program code; and b) at least one processor for executing the computer executable program code stored in the memory, wherein the computer executable program code that at least include the following code: code to receive seller data about at least one seller that include i) at least one seller qualitative characteristic about the at least one seller and at least one seller quantitative characteristic of the at least one seller, or ii) a plurality of seller qualitative characteristics about the at least one seller, or iii) a plurality of seller quantitative characteristics of the at least one seller; code to receive buyer data about at least one buyer that include i) at least one buyer qualitative characteristic about the at least one buyer and at least one buyer quantitative characteristic of the at least one buyer, or ii) a plurality of buyer qualitative characteristics about the at least one seller, or iii) a plurality of buyer quantitative characteristics of the at least one seller; code to generate, from the seller data, at least one seller profile for the at least one seller wherein the at least one seller profile comprising at least one seller statistical score calculated based at least in part on the at least one seller qualitative characteristic about the at least one seller or the at least one seller quantitative characteristic of the at least one seller, or both; code to generate, from the buyer data, at least one buyer profile for the at least one buyer wherein the at least one buyer profile comprising at least one buyer statistical score calculated based at least in part on the at least one buyer qualitative characteristic about the at least one buyer or the at least one buyer quantitative characteristic of the at least one buyer, or both; code to receive transaction data about at least one current transaction between the at least one seller and the at least one buyer for at least one first offering that include i) at least one transaction qualitative characteristic about the at least one current transaction, or ii) at least one transaction quantitative characteristic of the at least one current transaction; code to generate at least one transaction composite for the at least one current transaction based, at least in part, on: i) the generated particular seller profile, ii) the generated particular buyer profile, and iii) the at least one current transaction; code to determine at least one classification rule for each transaction composite class, wherein each classification rule is determined based at least in part on a plurality of conditions, wherein the plurality of conditions at least include: i) at least one of the following: the at least one seller qualitative characteristic, or the at least one seller quantitative characteristic, and the at least one seller statistical score, and ii) at least one of the following: the at least one buyer qualitative characteristic, the at least one buyer quantitative characteristic, and the at least one buyer statistical score, and iii) at least one of the following: the at least one transaction qualitative characteristic and the at least one transaction quantitative characteristic; and code to classify the at least one transaction composite into a particular transaction composite class based, at least in part, on comparing the at least one classification rule to: i) the generated at least one seller profile, ii) the generated at least one buyer profile, or iii) the at least one current transaction.

In some embodiments, the instant invention includes a computer system for determining an offer that includes at least the following components: a) memory having at least one region for storing computer executable program code; and b) at least one processor for executing the computer executable program code stored in the memory, where the computer executable program code at least include the following code: code to determine a demand for at least one offering from the at least one seller, wherein the demand is calculated based, at least in part, on: 1) at least one transaction composite, 2) at least one product preference function, wherein the at least one product preference function is based at least in part on: i) a plurality of offerings, ii) a price of each offering from the plurality of offerings, iii) a transaction composite class of the at least one transaction composite, wherein the at least one product preference function determines at least one ranked subset of offerings from the plurality of offerings, wherein the at least one ranked subset of offerings identifies a purchasing probability for each offering from the at least one ranked subset of offerings when each offering is being offered with at least one other offering from the at least one ranked subset of offerings, and wherein the at least one product preference function evaluates the purchasing probability of each offering from the at least one ranked subset of offerings based, at least in part, on at least one relationship between the price of each offering in the at least one ranked subset of offerings and the purchasing probability of each offering from the at least one ranked subset of offerings, and 3) at least one price sensitivity function, wherein the at least one price sensitivity function is based at least in part on: i) the at least one ranked subset from the plurality of offerings, ii) the price and the purchasing probability of each offering from at least one ranked subset, iii) the transaction composite class of the at least one transaction composite, wherein the at least one price sensitivity function determines the at least one relationship between the price of each offering from the at least one ranked subset of offerings and the purchasing probability of each offering from the at least one ranked subset of offerings; code to calculate a supply prediction for the at least one offering, wherein the supply prediction is determined based at least in part on: i) historical demand data indicating previous fulfillment of the at least one offering, ii) current demand data indicating at least one received but unfulfilled order availability of the at least one offering, and iii) capacity limit for fulfilling orders for the at least one offering; code to calculate a revenue prediction, wherein the revenue prediction determines a maximum expected revenue based at least on the determined demand for the at least one offering and the supply prediction for the at least one offering; and code to provide at least one offer to at least one potential buyer based, at least in part, on: (1) the determined demand for the at least one offering, (2) the calculated supply prediction, and (3) the calculated revenue prediction.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

In some embodiments, the instant invention provides for computer-implemented systems and methods that are designed to deliver an appropriate offer to an individual buyer based at least in part on historical information of a buyer and of a seller; as well as transactional data and information about a multitude of current and/or future events and/or occurrences (e.g., holidays, season, inventory, location, conventions, etc.). In some embodiments, the instant invention can be applied across all types of goods and services (e.g., upsale of hotel upgrade to a guest, upgrade of a car to a renter, offering an additional item to be included in a bundle with the item being purchased by a buyer, etc.).

In some embodiments, the instant invention utilizes information about current and/or future events and/or other information that can influence a buyer's purchasing decision to determine an offer that the buyer would more likely purchase. In some embodiments, the instant invention operates by processing inputted data to create and analyze relationships between information, things, events, and/or people. In some embodiments, the instant invention incorporates price elasticity computational analysis to determine relationships that govern price and customization of an offering. In some embodiments, the instant invention provides offering that are time dependent. In some embodiments, the instant invention provides offering that are time independent. In some embodiments, the instant invention provides computer-implemented systems that are capable to self-learning from outcomes. In some embodiments, the instant invention operates by having dynamic interaction(s) that translate buyer's action(s) into product presentation(s) and provoke, with product presentation, an increase in a likelihood that the buyer purchases/selects the offered product(s) and/or service(s).

In some embodiments, the computer-implemented systems and methods of the instant invention determine a selective offer of products, services, and/or information. In some embodiments, the computer-implemented systems and methods of the instant invention operate by aggregating and processing, based on computational models, current event information and accumulated historical information. In some embodiments, the computer-implemented systems and methods of the instant invention generate parameters that characterize, for example, object preferences, price elasticity, preference-elasticity interactions, and future effects/events. In some embodiments, the computer-implemented systems and methods of the instant invention utilize machine learning algorithms to improve the parameter estimates over time. In some embodiments, the computer-implemented systems and methods of the instant can be used in e-commerce and social media to improve response rate and/or revenue return for a particular offering.

In some embodiments, as detailed further, the computer-implemented systems and methods of the instant invention construct transaction composite computer data objects and classify them based on transaction composite classification. In some embodiments, as detailed further, the computer-implemented systems and methods of the instant invention use Transaction Composite computer data objects and their corresponding classes as inputs to generate individualized custom offerings by the inventive processing engine. In some embodiments, as detailed further, the computer-implemented systems and methods of the instant invention employ object preference and price elasticity interactions for dynamic determination of object sets of offerings and corresponding prices. In some embodiments, as detailed further, the computer-implemented systems and methods of the instant invention employ feedback loop mechanisms to modify and continuously update the inventive systems automatically.

Examples of Operating Environments

Figure 1:
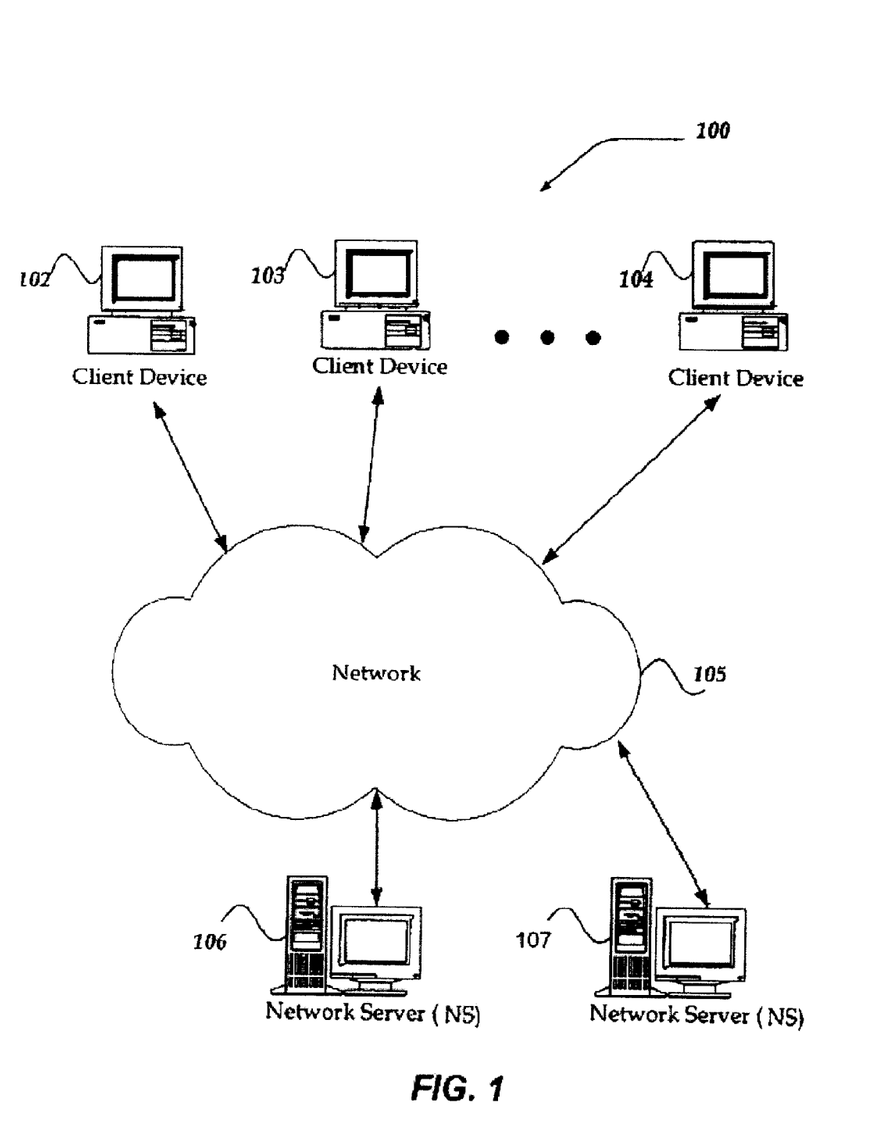
FIG. 1 illustrates an embodiment of the present invention.

FIG. 1 illustrates one embodiment of an environment in which the present invention may operate. However, not all of these components may be required to practice the invention, and variations in the arrangement and type of the components may be made without departing from the spirit or scope of the invention. In some embodiments, the system of the instant invention hosts a large number of members and concurrent transactions. In other embodiments, the system of the instant invention is based on a scalable computer and network architecture that incorporates various strategies for assessing the data, caching, searching, and database connection pooling. An example of the scalable architecture is an architecture that is capable of operating multiple servers.

In some embodiments, members of the inventive computer system 102-104 (e.g. user (e.g. traders etc.) include virtually any computing device capable of receiving and sending a message over a network, such as network 105, to and from another computing device, such as servers 106 and 107, each other, and the like. In some embodiments, the set of such devices includes devices that typically connect using a wired communications medium such as personal computers, multiprocessor systems, microprocessor-based or programmable consumer electronics, network PCs, and the like. In some embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in some embodiments, client devices 102-104 are any device that is capable of connecting using a wired or wireless communication medium such as a PDA, POCKET PC, wearable computer, and any other device that is equipped to communicate over a wired and/or wireless communication medium.

In some embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

Some embodiments of the instant invention can be programmed in computer languages, such as PHP, Python, Perl, C++, Fortran, Java and/or .Net, and/or statistical languages, like SAS and R.

In some embodiments, member devices 102-104 may be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In some embodiments, network 105 may be configured to couple one computing device to another computing device to enable them to communicate. In embodiments, network 105 may be enabled to employ any form of computer readable media for communicating information from one electronic device to another. Also, in some embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 2:
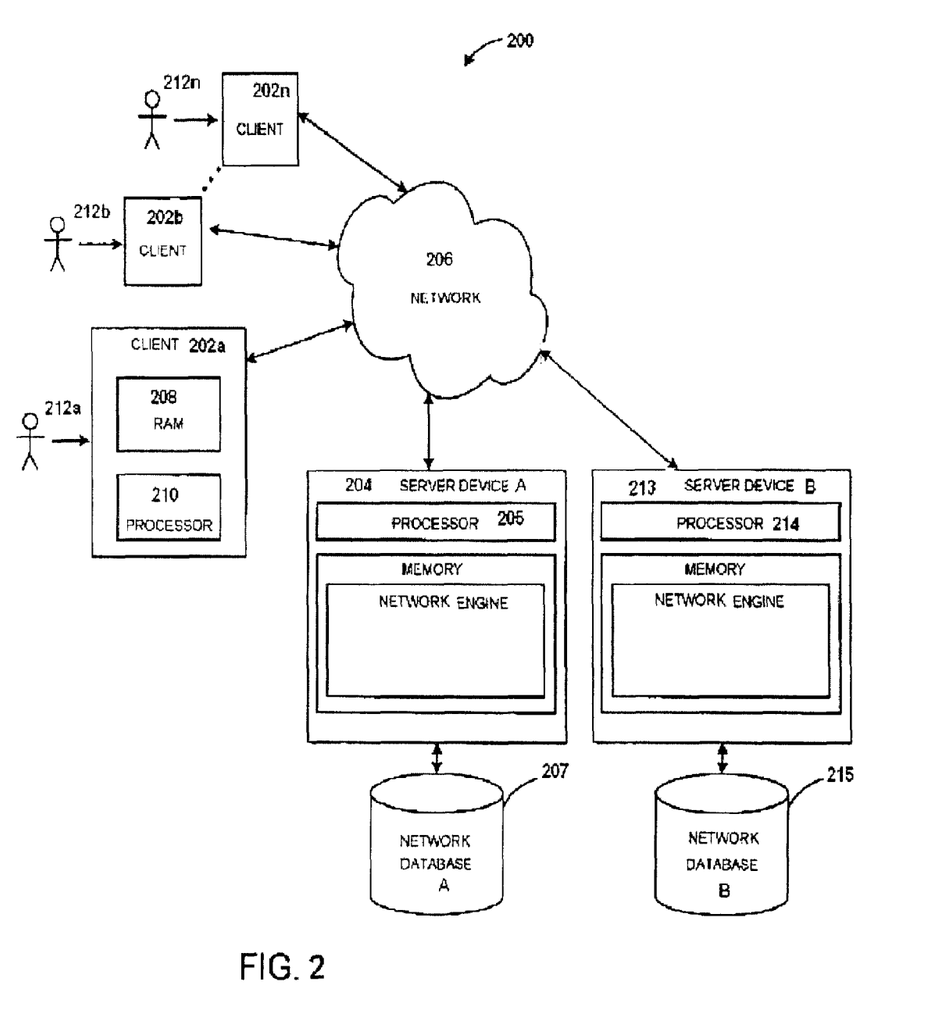
FIG. 2 illustrates another embodiment of the present invention.

FIG. 2 shows another exemplary embodiment of the computer and network architecture that supports the present invention. The member devices 202a, 202b thru 202n shown (e.g. traders' desktops) each comprises a computer-readable medium, such as a random access memory (RAM) 208 coupled to a processor 210 or FLASH memory. The processor 210 may execute computer-executable program instructions stored in memory 208. Such processors comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202a, with computer-readable instructions. Other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a are be any type of processor-based platform that is connected to a network 206 and that interacts with one or more application programs. Client devices 202a-n may operate on any operating system capable of supporting a browser or browser-enabled application, such as Microsoft™, Windows™, or Linux. The client devices 202a-n shown may include, for example, personal computers executing a browser application program such as Microsoft Corporation's Internet Explorer™, Apple Computer, Inc.'s Safari™, Mozilla Firefox, and Opera.

Through the client devices 202a-n, users (e.g. traders, etc.) 212a-n communicate over the network 206 with each other and with other systems and devices coupled to the network 206. As shown in FIG. 2, server devices 204 and 213 may be also coupled to the network 206.

Examples of Various Embodiments of the Present Invention

Definitions

Seller. An entity or an individual that has provided, provides or will provide an offering (product, service, etc.) in a commercial or non-commercial transaction that includes, but not limited to, a current transaction (entered or concluded transaction), a future transaction, or a potential transaction.

Buyer. An entity or an individual that has provided, provides or will provide a compensation (monetary and/or non-monetary) for the seller's offering(s) in a commercial or non-commercial transaction that includes, but not limited to, a current transaction (entered or concluded transaction), a future transaction, or a potential transaction.

Seller information (or seller data). Seller's qualitative and/or quantitative measurement(s)/characteristic(s) that describe a seller and/or the seller's behavior. In some embodiments of the present invention, seller information (or seller data) is a collection of at least one seller qualitative and at least one seller quantitative measurements/characteristics. In some embodiments of the present invention that are directed to merchandizing hotel services, the seller is a hotel, and the hotel can have at least two seller qualitative measures/characteristics such as its star rating (e.g. "4 star") and its type (e.g. "luxury," as designated from, for example, among the following: luxury, destination, standard, airport, or resort.) In some embodiments related to hotel service, the hotel can have at least two seller quantitative measures/characteristics of a seller (e.g., a hotel) such as its total room count (e.g., 750) and complete details of each room for which a reservation was made in the last 12 months. In some embodiments, the instant invention's use of such information results in an outcome where, in the inventive process(es) of generating offering(s), a 4-start luxury hotel with 750 rooms would be handled differently from a 2-star airport hotel with 200 rooms.

Buyer information (or buyer data). Buyer's qualitative and/or quantitative measurement(s)/characteristic(s) that describe a buyer and/or the buyer's behavior. In some embodiments of the present invention, buyer information (or buyer data) is a collection of at least one buyer qualitative and at least one buyer quantitative measurements/characteristics. In some embodiments of the present invention that are directed to merchandizing hotel services, for example, the buyer is a guest at a hotel, and the guest can have at least two buyer qualitative measures/characteristics such as the buyer's first name (e.g., "Andrew") and an indicator (e.g., "Yes") identifying whether the buyer has loyalty status with any given seller. In some embodiments related to hotel service, the guest can have at least two buyer quantitative measures/characteristics which can be the number of social networks the buyer participates in (e.g., 2) and details of each hotel transaction made by the buyer over the last 12 months. In some embodiments, the instant invention's use of such information results in an outcome where, in the inventive process(es) of generating offerings, the guest named "Andrew" who has loyalty status with a hotel, participates in 2 social networks, and has made many transactions over the last 12 months would be handled differently from a guest named "Anna" who has no loyalty status, participates in no social networks, and has stayed at no hotel over the last year.

Seller profile. Information that includes at least some result(s) of analyzing seller information (or seller data) (e.g., a summary of seller information/data or other suitable equivalent). In some embodiments, for example, instead of the complete details of each booking made over the last 12 months, which would be contained in the hotel's seller information, the hotel's seller profile may have results of analysis of the hotel's seller information such as a summary of total number of bookings (e.g., 35,000), the average length of stay (e.g., 2.7), the median daily rate (e.g., $275), and/or at least one seller statistical score that describes variability in the hotel's booking patterns. In some embodiments, seller profiles include analyzed and/or organized data which can be used in further mathematical/logical modeling/computer processing.

Buyer Profile. Information that includes at least some result(s) of analyzing the buyer information (or buyer data) (e.g., a summary of the buyer information/data or other suitable equivalent). In some embodiments, for example, instead of the complete details of each hotel transaction made over the last year, which would be contained in the buyer information, the buyer profile may have results of analysis of the buyer's information such as a summary of the total number of transactions (e.g., 7), the mode of additional guests (e.g., 1), the average price paid (e.g., $385), and/or at least one buyer statistical score that describes other buyer characteristic(s). In some embodiments, buyer profiles include analyzed and/or organized data which can be used in further mathematical/logical modeling/computer processing.

Agent Profile Processing. At least one statistical, mathematical, and/or logical procedure (and associated software and hardware) to analyze seller information and/or buyer information and generate seller profiles and/or buyer profiles. In some embodiments, the agent profile processing take seller information as input and produce a corresponding seller profile as output. In some embodiments, the agent profile processing take buyer information as input and produce a corresponding buyer profile as output. In some embodiments, the agent profile processing take both seller and buyer information as input and produce corresponding seller and buyer profiles as output. In some embodiments, the agent profile processing may include, but not limiting to, outputting the seller and buyer statistical scores mentioned in the descriptions of the definitions of the seller profile and buyer profile. In some embodiments, the outputted statistical scores may include, but not limited to, average, median, mode, and/or count.

Example 1

Agent Profile Processing of Seller Information

Tables 1 and 2 list exemplary seller qualitative and quantitative measurements/characteristics found in the seller information of a potential seller, such as a hotel.

TABLE 1

| Parameter | Value |
| --- | --- |
| Star Rating | "4-Star" |
| Room Count | 700 |
| Category Count | 21 |

TABLE 2

| Bookings | Type Of Room Booked | Length of Stay | Daily Rate | Arrival Day of Week |
| --- | --- | --- | --- | --- |
| 1 | Standard King | 1 | $500 | Tuesday |
| 2 | Standard King | 4 | $500 | Saturday |
| 3 | Deluxe Suite | 1 | $2000 | Saturday |

Then, Table 3 represents an exemplary seller profile that is outputted for this particular seller by the agent profile processing.

TABLE 3

| Profile Dimension | Value |
| --- | --- |
| Star Rating | "4-Star" |
| Room Count | 700 |
| Category Count | 21 |
| Mean Length of Stay | 2 |
| Mode Length of Stay | 1 |
| Mean Daily Rate | $1000 |
| Mode Daily Rate | $500 |
| Mode Arrival Day of Week | Saturday |
| Proportion of Standard King Type Among All of Booked Rooms | 0.67 |

Transaction Information/Data. Transaction's qualitative and/or quantitative measurement(s)/characteristic(s) that describe current transaction(s) that particular seller(s) and buyer(s) have entered or intend to enter. In some embodiments, for example, the current transaction is a hotel room booking, and then the transaction information may include transaction qualitative measurement(s)/characteristic(s) such as name of the property where the booking is made or to be made (e.g., "Hilton San Francisco Union Square") and/or the booked room type (e.g., "City View King Deluxe"). The transaction information may also include transaction qualitative measurement(s)/characteristic(s) such as, transaction quantitative measurement(s)/characteristic(s) such as the length of stay (e.g., 5 nights) and/or the total purchase price (e.g., $2,150). In some embodiments, the instant invention utilizes the transaction information/data to generate additional customized offer to a buyer who made or is making this booking.

Transaction Composite. A collection of the transaction information/data, seller profile, and buyer profile.

Transaction Composite Class. A designation that is determined for each transaction composite. In some embodiments, each transaction composite class is defined according to at least one classification rule that is determined by a plurality of conditions, where the plurality of conditions include:

i) at least one of the following: the at least one seller qualitative characteristic, or the at least one seller quantitative characteristic, and the at least one seller statistical score, and ii) at least one of the following: the at least one buyer qualitative characteristic, the at least one buyer quantitative characteristic, and the at least one buyer statistical score, and iii) at least one of the following: the at least one transaction qualitative characteristic and the at least one transaction quantitative characteristic.

In some embodiments, each transaction composite class is defined according to at least one classification rule that is determined by a plurality of conditions, where the plurality of conditions are based at least in part on one or more of the following: i) the at least one seller qualitative characteristic, ii) the at least one seller quantitative characteristic, iii) the at least one seller statistical score, iv) the at least one buyer qualitative characteristic, v) the at least one buyer quantitative characteristic, (vi) the at least one buyer statistical score, vii) the at least one transaction qualitative characteristic and/or viii) the at least one transaction quantitative characteristic.

Example 2

Transaction Composite Class

In some embodiments, for example, if all the underlying transactions are hotel room bookings, then the following classification rules (and, classes/groups) can exist:

if length of stay is more than one AND guest has made more than 5 transactions in the last 12 months AND hotel has more than 500 rooms, then the transaction composite having such data would be classified as transaction composite class A (or associate with group A);

if length of stay is more than one AND guest has made less than or equal to 5 transactions in the last 12 months AND hotel has less than 200 rooms, then the transaction composite having such data would be classified as transaction composite class B (or associate with group B); or If the transaction composite having data that do not meet either 1 or 2 classification rules, then the transaction composite would be classified as transaction composite class C (or associate with group C).

In some embodiments, classification rule(s) of each transaction composite class are mutually exclusive with respect to classification rule(s) of another transaction composite class, which is to say that one and only one transaction composite class can be condition can be assigned. In some embodiments, the classification into a particular transaction composite class is utilized in estimating likelihood(s) of outcomes during generating individually customizable offers that can be optimized based, at least in part, on projected revenue.

Transaction Composite Processing. Generating transaction composite classes that includes at least one classification rule based, at least in part, on at least one statistical, mathematical, and/or logical procedure (and associated software and hardware) and input data from seller profile, buyer profile, and the transaction information/data; and classifying a particular transaction composite according to generated transaction composite classes. In some embodiments, for example, statistical procedures that are utilized by the transaction composite processing may include, but not limited to, branching tree-process, clustering process, support vector machine, or any other suitable data mining techniques such as neural networks, random forests, etc. In some embodiments, a set of classification rules are coded into a transaction composite processing module.

Product Availability Information. Information that include, but not limited to, at least one of: (1) historical data that indicate whether demands for a given product where fulfilled, (2) current data that indicate the quantities of future demands that are known in advance, and/or (3) capacity limitations. In some embodiments, for example, where seller is a hotel, a particular product may be defined as two contiguous room nights in a particular room category, such as "17 August and 18 August in an Ocean View King." The product availability information for this example may then include (1) historical demands and fulfillments for the product in the year 2010, (2) future demands already on the books for the product in 2011, and/or (3) a capacity limitation of 45 units.

Supply Prediction. At least one statistical, mathematical, and/or logical procedure (and associated software and hardware) that takes as input the product availability information and produce as output a probability of the fulfillment of a demand for a given product in a given quantity. In some embodiments, for the example used above in the definition of the product availability information, the output of supply prediction for the year 2011 and quantity 1 may be 0.73, or a 73 percent chance of fulfilling a request for one stay over "2011-08-17 and 2011-08-18 in an Ocean View King." In some embodiments, the supply prediction provides output that can be used to find a price that balances supply and demand.

Product Preference Model/Module/Function. Model/Software Module/Function that characterizes the way in which the desirability (purchasing probability) of any given product, at a given price, depends on the set of other products with which the given product is offered. In some embodiments, the product preference model (function(s)) includes, but not limited to, at least one statistical, mathematical, and/or logical procedure (and associated software and hardware) that takes, but is not limited to, a plurality of products, their corresponding prices, at least one relationship between price and probability of purchasing (purchasing probability) of each product, a transaction composite, and a transaction composite class, and produces a ranked subset of products which are ranked based on purchasing probability (probability of purchase) of each product. In some embodiments, the ranked subset can be the entire original set of the plurality of products.

Example 3

Product Preference Model/Module/Function

Input. For some embodiments, suppose there are two products in the set, called product 1 and product 2. Suppose the set of relationships between price and probability of purchase are as follows, where $p(1)$ and $p(2)$, denote the prices of product 1 and product 2, respectively, and transaction composite class is denoted TCC:

Pr{buy product 1 given p(1) and p(2) and TCC}=g(1)(p(1), p(2))=1/(1+exp(−0.1×(p(1)+p(1)/(p(1)+p(2))))$^{-1}$)

Pr{buy product 2 given p(1) and p(2) and TCC}=g(2)(p(1), p(2))=1/(1+exp(−0.1×(p(2)+p(2)/(p1+p(2))))$^{-1}$)

Suppose the prices are p(1)=$5 and p(2)=$10. Then g(1)= 0.37 and g(2)=0.25, and the products are ranked Product 1>Product 2, because g(1)>g(2). The product preference model then generates the possible subsets of products and evaluates the changes in purchase probability of each product. Here's a table of probabilities that result from offering different subsets of Product 1 and Product 2.

TABLE 4

| Subset | Prices (p(1), p(2)) | Probabilities (g(1), g(2)) |
|---|---|---|
| 1 and 2 | $5, $10 | 0.37, 0.26 |
| 1 only | $5, NULL | 0.35, NULL |
| 2 only | NULL, $10 | NULL, 0.25 |
| No product | NULL, NULL | NULL, NULL |

Price Sensitivity Model/Module/Function. Model/Software Module/Function that characterizes the way in which the desirability (purchasing probability) of any given product, when offered with a given set of products, depends on the price of each and every product in the entire set of products. In some embodiments, the price sensitivity model (function(s)) includes, but not limited to, at least one mathematical, statistical, and/or logical procedures that take, but is not limited to, a plurality of products, a transaction composite class, and produce at least one relationship between the price of each and every product in the set and the probabilities of purchasing (purchasing probabilities) any one of the products in the set. In some embodiments, the given set of products is the ranked set of products which is determined by the product preference model (function(s)). In some embodiments, the price sensitivity model (function(s)) includes, but not limited to, various types of regression (linear, logistic, polynomial, kernel, etc.) and/or other suitable data mining techniques.

Example 4

Price Sensitivity Model/Module/Function

For some embodiments, for example, suppose, for example, that there are two transaction composite classes, denoted TCC(1) and TCC(2). In some embodiments, the price sensitivity model may return the following two relationships, denoted f(1) and f(2), corresponding to TCC(1) and TCC(2), respectively. (Let X={1, ..., N} denote the index set of the products, and let p denote an N-dimensional vector of prices.)

$$TCC(1): f_1(p,n)=1/(1+\exp(-0.1\times(p_n+p_n/(\Sigma_{m\in X}p_m))))'$$
where $n \in X$ $$TCC(2): f_2(p,n)=1/(1+\exp(-0.5\times(p_n+p_n/(\Sigma_{m\in X}p_m))))^{-1}$$
where $n \in X$ From the above example, it can be seen that, in some embodiments, the purchasing probability decreases faster with respect to increases in price for TCC(2) versus TCC(1). Consequently, the price sensitivity model identifies different price sensitivities appropriate for each TCC.

For example, if it is assumed that N=2 and the price of Product 1 is held constant, Table 5 shows how the price sensitivities can differ.

TABLE 5

| Price of Product 1 p(1) | Price of Product 2 p(2) | TCC1 Product 2 Purchasing Probability f(1)((p(1), p(2)), 2) | TCC2 Product 2 Purchasing Probability f(2)((p(1), p(2)), 2) |
|---|---|---|---|
| $5 | $5 | 37% | 26% |
| $5 | $10 | 26% | 11% |

Consequently, in some embodiments, the purchasing probability for Product 2, when the price of Product 2 increases from $5 to $10, reduces by about 30% for TCC1 (from 37% down to 26%), while the TCC2 has a reduction of about 58% (from 26% down to 11%). In other words, TCC2 exhibits price elasticity of demand almost double that of TCC1.

Product Interactions. Ranked subset(s) of products with purchasing probabilities outputted by the product preference model/module/function and inputted into the price sensitivity model/module/function. In the above Example 3 regarding the product preference model/module/function, the product interaction is represented by Table 4.

Price Interactions. Relationships between price and purchasing probability of products outputted by the price sensitivity model/module/function and inputted into the inputted to the product preference model/module/function. In the above Example 4 regarding the price sensitivity model/module/function, the price interaction is the set of functions for TCC(1) and TCC(2), denoted f(1) and f(2), as shown in Table 5.

Demand Prediction. An interdependent software module/system that includes at least one product preference model/module/function exerting at least one product interactions on at least one price sensitivity model/module/function which, in turn, exerts at least one price interaction on the at least one product preference model/module/function, all under certain parameterization of a given transaction composite and a given transaction composite class.

Product/Object Selection and Pricing Optimization Model/Module/Function. A model/software module/function that utilizes the demand prediction model/software module/function and the supply prediction model/software module/function to determine a bundling of products at corresponding prices that maximize the expected revenue from the current transaction that is classified into a particular transaction composite class.

Example 5

Product/Object Selection and Pricing Optimization Model/Module/Function

For some embodiments, for example, suppose there is a product set consisting of two products, indexed by 1 and 2. The supply prediction module/system predicts that the probability of fulfilling a demand of one unit of product 1 is 50%, and the probability of fulfilling a demand of one unit of product 2 is 75%. Suppose a transaction composite class is TCC1 as in the above Example 4 regarding the price sensitivity model/module. The expected revenue from the underlying transaction, as a function of the prices of product 1 and product 2, denoted p(1) and p(2), respectively, can be divided into 4 cases:

Case 1: 0.05×p(1)×f(1) ((p(1), p(2)), 1)+0.95×p(2)×f(1) ((p(1), p(2)), 2) if both products 1 and 2 are kept, Case 2: 0.05×p(1)×f(1) ((p(1), 0), 1) if only product 1 is kept, Case 3: 0.95×p(2)×f(1) ((0, p(2)), 2) if only product 2 is kept, and Case 4: 0 if no products are kept.

In some embodiments, the product/object selection and pricing optimization model/module/function receives outputs from the product preference model/module to evaluate the above different cases, the price sensitivity model/module to evaluate different prices, and the supply prediction model/module to provide the supply probabilities, and determines at least one bundling of products at corresponding prices that achieves maximal expected revenue. In some embodiments, for example, the product/object selection and pricing optimization model/module/function can utilize simple grid search, gradient methods, approximation methods, interior point methods, and other similar suitable methods for its determination. In some embodiments, regarding Examples 1-5, an optimal product set and prices are product 1 at $16 and product 2 at $13 (product 1 is priced higher because its supply is more limited than that of product 2.)

Offer. An optimal set of products (a bundle) with corresponding prices determined by the product/object selection and pricing optimization model/module/function and provided to a buyer on behalf of a seller. Regarding Examples 1-5, the offer includes product 1 for $16 and product 2 for $13.

Figure 3:
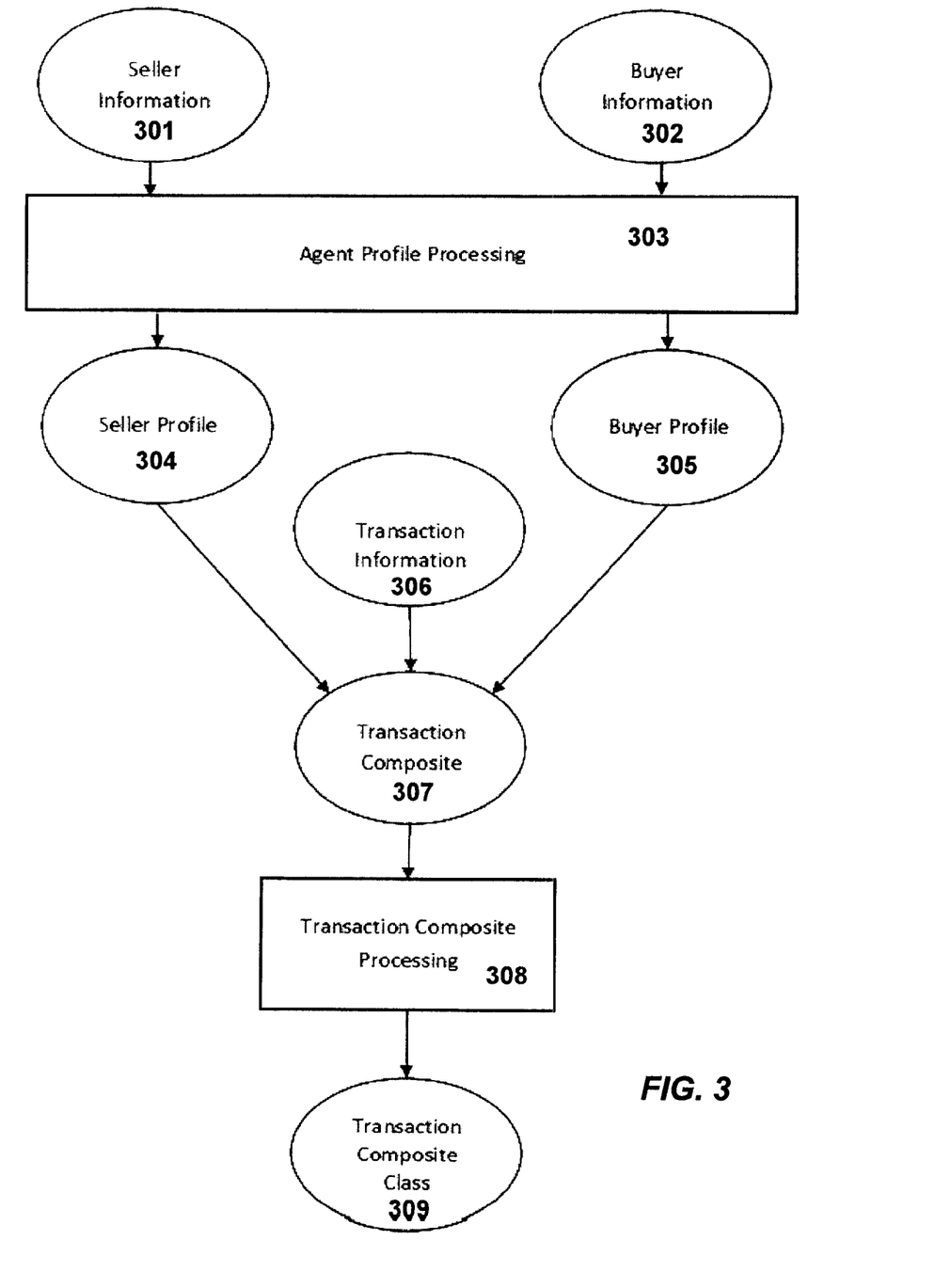
FIG. 3 illustrates yet another embodiment of the present invention.

In some embodiments, as illustrated by a flowchart of FIG. 3, the instant invention include a computer-implemented method for processing transaction-related data that can include steps of: receiving seller information/data (301) about at least one seller; receiving buyer information/data (302) about at least one buyer; generating, by an agent profile processing module(303), from the seller information/data (301), at least one seller profile (304) for the at least one seller and, from the buyer information/data (302), at least one buyer profile (305); receiving, by a computer system, transaction data about at least one current transaction (306); generating, by a computer system, at least one transaction composite (307) for the at least one current transaction; generating, by transaction composite processing module (308), a plurality of transaction composite classes comprising at least one classification rule for each transaction composite class; and classifying, by transaction composite processing module (308), the at least one transaction composite into a particular transaction composite class (309).

Some embodiments of the instant invention include a process of initiating at least one electronic request to at least one electronic source to obtain the seller information/data (301). In some embodiments.

Some embodiments of the instant invention include a process of initiating at least one electronic request to at least one electronic source to obtain the buyer information/data (302). In some embodiments, the electronic source can be a social network source such as Facebook, Myspace, Youtube, GoogleGroups, Farmville and any other similar Internet community structures.

Figure 4:
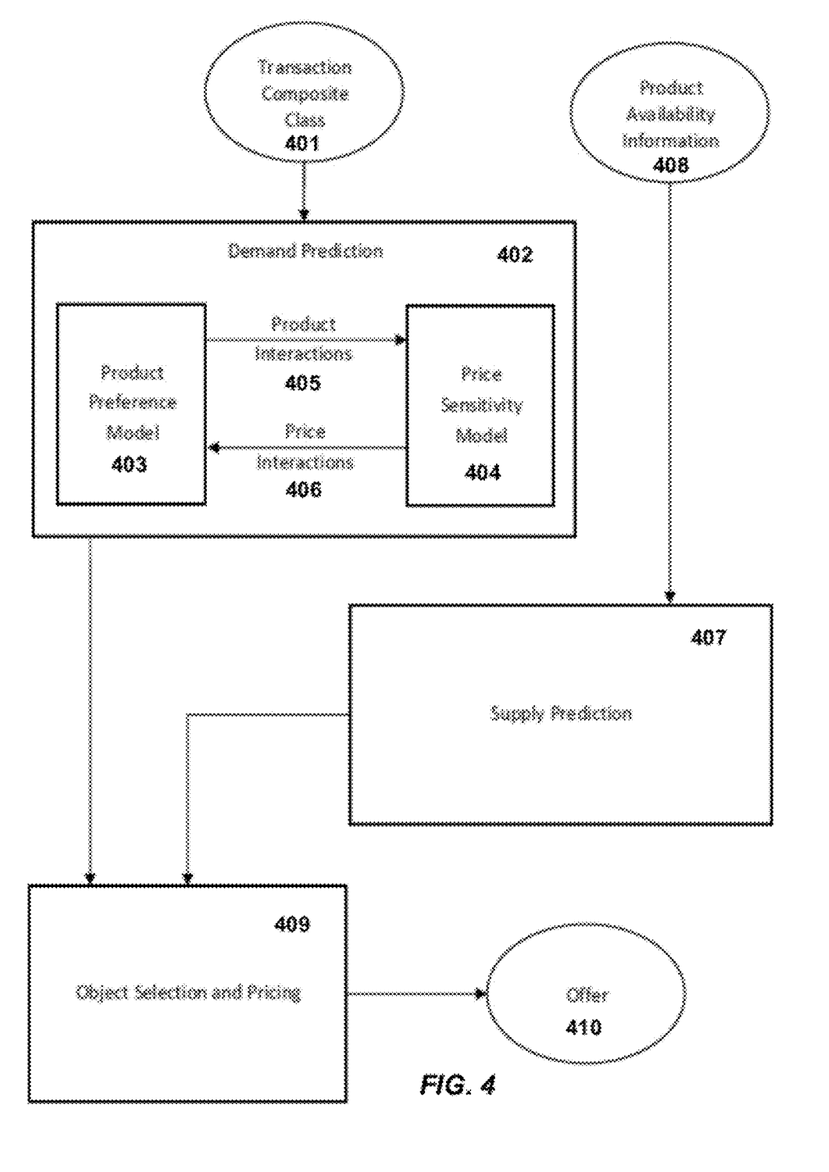
FIG. 4 illustrates yet another embodiment of the present invention.

In some embodiments, as illustrated by a flowchart of FIG. 4, the instant invention include a computer-implemented method for determining an offer (410) that can include steps of: determining a demand for at least one offering from a seller by a demand prediction model/module/function (402) that includes a product preference module/function (403) and a price sensitivity model/module/function (404). In some embodiments, one input received by the demand prediction module (402) is a transaction composite class (401) of a transaction composite made of a buyer profile, a seller profile and information about current transaction(s) between the seller and the buyer. In some embodiments, the product preference module/function (403) outputs product interaction(s) (405) identify at least one ranked subset of offerings from a plurality of offerings having a purchasing probability for each offering from the at least one ranked subset of offerings when each offering is being offered with at least one other offering from the at least one ranked subset of offerings. In some embodiments, the product preference model/module (403) evaluates the purchasing probability of each offering from the at least one ranked subset of offerings based, at least in part, on price interaction(s) (406) (e.g., relationship(s) between the price of each offering in the at least one ranked subset of offerings and the purchasing probability of each offering from the at least one ranked subset of offerings) received from the price sensitivity model/module (404). In some embodiments, the price sensitivity model/module (404) utilizes the product interaction(s) (405) and the transaction composite class (401) of the at least one transaction composite to determine the price interaction(s) (406). In some embodiments, the determination of the offer (410) further can include steps of: calculating supply prediction for the at least one offering by a supply prediction model/module/function (407) based at least in part on product availability information (408) (e.g., historical demand data indicating previous fulfillment of the at least one offering, current demand data indicating at least one received but unfulfilled order availability of the at least one offering, and/or capacity limit for fulfilling orders for the at least one offering); calculating a revenue prediction of a maximum expected revenue based at least on the determined demand for the at least one offering and the supply prediction for the at least one offering by an product/object selection and pricing optimization model/module/function (409); and providing the offer (410) to the buyer based, at least in part, on: inputs received from the demand prediction model/module/function (402), the supply prediction model/module/function (407) and the calculated revenue prediction.

Example 6

A bundling offer for current transaction involving a physical Product (e.g., TV)

Setting. The seller is an electronics retailer, one that specializes in TVs and TV accessories. The buyer is a consumer. The transaction is the purchase of a low-end TV. There are two additional products that could potentially be merchandised in an offer to the buyer, and they are a remote control (the "Super Glow Remote"), and a high-end television (the "Super TV"). The remote is an example of merchandising for cross-selling, and the high-end TV is an example of merchandising for up-selling.

Step 1. Receive buyer information (301) and seller information (302). Suppose the buyer information include information given in Tables 6 and 7.

TABLE 6

| Parameter | Value |
| --- | --- |
| First name | "Andrew" |
| Location | 94085 (Sunnyvale, CA) |

TABLE 7

| Purchases | Product | Price | Days Ago |
| --- | --- | --- | --- |
| 1 | "Laptop Computer" | $2,000 | 400 |
| 2 | "Tablet Computer" | $1,000 | 400 |
| 3 | "Laptop Computer" | $3,000 | 50 |

Suppose the seller information include information given in Tables 8 and 9.

TABLE 8

| Parameter | Value |
| --- | --- |
| Specialty | "Televisions" |
| Physical Location Count | 0 (Web Only) |

TABLE 9

Seller's Transaction Data

| Sales | Product | Price |
| --- | --- | --- |
| 1 | "Television" | $300 |
| 2 | "Television" | $700 |
| 3 | "Super Glow Remote" | $200 |

Step 2. An agent profile processing module (303) to produce a buyer profile (305), given in Table 10, and a seller profile (306), given in Table 11. In some embodiments, suppose the statistical procedures are limited to mean, mode, and count, but additional lookup data are available (e.g., the urbanity index of a zip code and the likely gender of a first name.)

TABLE 10

| Profile Dimension | Value |
| --- | --- |
| Gender (inferred from first name) | "Male" |
| Urbanity Index | 7.0 |
| Days Since Last Purchase | 50 |
| Mean Purchase Price | $2,000 |
| Common Purchase | "Laptop Computer" |
| Proportion Laptop Computer to All Purchases | 0.67 |

TABLE 11

| Profile Dimension | Value |
| --- | --- |
| Specialty | "Televisions" |
| Physical Location Count | 0 (Web Only) |
| Common Sale | "Television" |
| Mean Purchase Price | $400 |
| Standard Deviation of Television Sales | 0.8165 |

Step 3. Receive transaction information/data (306) and assemble with the buyer profile (305) and the seller profile (304) to create a transaction composite (307). Suppose the transaction information is simply the following, given in Table 12.

TABLE 12

| Product | Price |
| --- | --- |
| "Television" | $500 |

Step 4. The transaction composite processing module 308 to classify the transaction composite (307) into a transaction composite class (309). In some embodiments, suppose the transaction composite processing module (308) consists of the following classification rules, generated at an earlier time from a statistical procedure such as partitioning:

1. IF (Buyer Profile: Gender)="Male" AND (Buyer Profile: Mean Purchase Price)>(Transaction Information: Price) AND (Seller Profile: Common Sale)=(Transaction Information: Product) THEN Transaction Composite Class=TCC1

2. Otherwise, IF (Buyer Profile: Mean Purchase Price)>(Transaction Information: Price) THEN Transaction Composite Class=TCC2

3. Otherwise, Transaction Composite Class=TCC3

Based on the above classification, the transaction composite (307) will be classified as TCC1. The classification depends on all three parts of the transaction composite (307): the buyer profile, the seller profile, and the transaction information.

Step 5. The supply prediction module (407), based on product availability information (408), predicts the supply demand. Suppose the product availability information (408) shows overwhelmingly that both the Remote and the Premium TV are essentially always available. Then, the output of the supply prediction module (407) is a probability of fulfillment equal to 100% for both products. In some embodiments, such supply prediction probabilities can be determined by computing average historical availability or other suitable methods.

Step 6. Retrieve the price sensitivity model (404) that corresponds to the transaction composite class (401, 309). Suppose that, for TCC1, the price sensitivity model was computed at an earlier time and resulted in the function below, where n=1 corresponds to the remote and n=2 corresponds to the premium TV:

$$f(p(1),p(2),n=1)=1/(1+\exp(-0.1\times(p(1)+p(1)/(p(1)+p(2))))^{-1})$$

$$f(p(1),p(2),n=2)=1/(1+\exp(-0.1\times(p(1)+p(1)/(p(1)+p(2))))^{-1}$$

In some embodiments, the above functions are estimated by taking all previous transactions classified in the transaction composite class TCC1 and execute a statistical procedure that finds a model of price sensitivity that minimizes historical error (e.g., applying regression analysis).

Step 7. Product/Object Selection and Pricing Optimization (409) to output the Offer (410). In some embodiments, the process of product/object selection and pricing module (409) employs an optimization model that is based on the demand prediction system (402). In some embodiments, the price sensitivity model (404) is retrieved first. In some embodiments, the product preference model (403) is retrieved first. In some embodiments, as the process of product/object selection and pricing module (409) operates, the product preference model (403) uses the price interactions (406) output by the price sensitivity model (404) to continually evaluate the revenue from offering each possible subset of the two products, that is:

$1^{st}$ Subset: Both the Remote and the Premium TV $2^{nd}$ Subset: Just the Premium TV $3^{rd}$ Subset: Just the Remote.

In some embodiments, the product interactions (405) are simultaneously fed back, and an equilibrium is sought that achieves the maximum expected revenue. In the three product subsets evaluated by the product preference model/module (403), the expected revenues are described as follows (remembering that the supply prediction is 100% chance of fulfillment).

$1^{st}$ Subset: Both the Remote and the Premium TV:

$$p(1)\times f(p(1),p(2),n=1)+p(2)\times f(p(1),p(2),n=2)$$

$2^{nd}$ Subset: Just the Premium TV: $p(1)\times f(p(1),p(2),n=1)$ $3^{rd}$ Subset: Just the Remote: $p(2)\times f(p(1),p(2),n=2)$ Performing the optimization, the product/object selection and pricing module (409) determines that the optimal offer (410) contains both products, achieving the maximal expected revenue of about $30: Remote for an extra $13 and Premium TV for an extra $128.

Step 8. Provide the offer (410) to the buyer. In some embodiments, the offer (410) is displayed as a web page.

Step 9. Record the buyer's response.

Example 7

A bundling offer for current transaction involving a service (e.g., Hotel Room Upgrade)

Setting. The seller is a hotel. The buyer is a consumer. The transaction is the purchase of a standard room for one night. There are two additional products that could potentially be merchandised in an offer to the buyer, and they are a "Continental Breakfast," and a "Premium Suite." The breakfast is an example of merchandising for cross-selling, and the premium suite is an example of merchandising for up-selling.

Step 1. Receive buyer information (301) and seller information (302). Suppose the buyer information include information given in Tables 13 and 14.

TABLE 13

| Parameter | Value |
|---|---|
| First name | "Anna" |
| Location | 21231 (Baltimore, MD) |

TABLE 14

| Purchases | Product | Price per Night | Days Ago |
|---|---|---|---|
| 1 | "Standard King" | $200 | 100 |
| 2 | "Junior Suite" | $1,000 | 50 |
| 3 | "Ocean View Suite" | $600 | 10 |

Suppose the seller information include information given in Tables 15 and 16.

TABLE 15

| Parameter | Value |
|---|---|
| Star Rating | "4-Star" |
| Room Count | 700 |
| Category Count | 21 |

TABLE 16

| Bookings | Length of Stay | Price per Night | Arrival Day of Week |
|---|---|---|---|
| 1 | 1 | $500 | Tuesday |
| 2 | 4 | $500 | Saturday |
| 3 | 1 | $2,000 | Saturday |

Step 2. An agent profile processing module (303) to produce a buyer profile (305), given in Table 17, and a seller profile (306), given in Table 18. In some embodiments, suppose the statistical procedures are limited to mean, mode, and count, but additional lookup data are available (e.g., the urbanity index of a zip code and the likely gender of a first name.)

TABLE 17

| Profile Dimension | Value |
|---|---|
| Gender (inferred from first name) | "Female" |
| Urbanity Index | 10.0 |
| Days Since Last Purchase | 10 |
| Mean Price per Night | $600 |
| Common Purchase | "Suite" |
| Relative Frequency of Most Common Purchase | 0.67 |

TABLE 18

| Profile Dimension | Value |
|---|---|
| Star Rating | "4-Star" |
| Room Count | 700 |
| Category Count | 21 |
| Mean Length of Stay | 3 |
| Mode Length of Stay | 1 |
| Mean Daily Rate | $1000 |
| Mode Daily Rate | $500 |
| Mode Arrival Day of Week | "Saturday" |
| Standard Deviation of Occurrence of Mode Arrival Day of Week | 0.8165 |

Step 3. Receive transaction information (306) and assemble with the buyer profile (305) and the seller profile (304) to create a transaction composite (307). Suppose the transaction information/data (306) is simply the following, given in Table 19.

TABLE 19

| Product | Price per Night | Length of Stay | Arrival Day of Week |
|---|---|---|---|
| "Standard King" | $500 | 5 | "Saturday" |

Step 4. The transaction composite processing module 308 to classify the transaction composite (307) into a transaction composite class (309). In some embodiments, suppose the transaction composite processing module (308) consists of the following classification rules, generated at an earlier time from a statistical procedure such as partitioning:

1. IF (Buyer Profile: Gender)="Female" AND (Buyer Profile: Mean Price per Night)>(Transaction Information: Price per Night) AND (Seller Profile: Mode Arrival Day of Week)= (Transaction Information: Arrival Day of Week) THEN Transaction Composite Class=TCC1

2. Otherwise, IF (Buyer Profile: Mean Price per Night)> (Transaction Information: Price per Night) THEN Transaction Composite Class=TCC2

3. Otherwise, Transaction Composite Class=TCC3

Based on the above classification, the transaction composite (307) will be classified as TCC1. The classification depends on all three parts of the transaction composite (307): the buyer profile, the seller profile, and the transaction information.

Step 5. The supply prediction module (407), based on product availability information (408), predicts the supply demand. Suppose the product availability information (408) shows that (as expected) the breakfast is always available, but the premium suite is available only 1 of every 2 requests. Then, the output of the supply prediction module (407) is a probability of fulfillment equal to 100% for the breakfast and 50% for the suite. In some embodiments, such supply prediction probabilities can be determined by computing average historical availability or other suitable methods.

Step 6. Retrieve the price sensitivity model (404) that corresponds to the transaction composite class (401, 309). Suppose that, for TCC1, the price sensitivity model was computed at an earlier time and resulted in the function below, where n=1 corresponds to the breakfast and n=2 corresponds to the suite.

$$f(p(1),p(2),n=1)=1/(1+\exp(-0.05\times(p(1)+p(1)/(p(1)+p(2))))^{-1})$$

$$f(p(1),p(2),n=2)=1/(1+\exp(-0.007\times(p(1)+p(1)/(p(1)+p(2))))^{-1}$$

In some embodiments, the above functions are estimated by taking all previous transactions classified in the transaction composite class TCC1 and execute a statistical procedure that finds a model of price sensitivity that minimizes historical error (e.g., applying regression analysis).

Step 7. Product/Object Selection and Pricing Optimization (409) to output the Offer (410). In some embodiments, the process of product/object selection and pricing module (409) employs an optimization model that is based on the demand prediction system (402). In some embodiments, the price sensitivity model (404) is retrieved first. In some embodiments, the product preference model (403) is retrieved first. In some embodiments, as the process of product/object selection and pricing module (409) operates, the product preference model (403) uses the price interactions (406) output by the price sensitivity model (404) to continually evaluate the revenue from offering each possible subset of the two products, that is:

1$^{st}$ Subset: Both the Breakfast and the Suite
2$^{nd}$ Subset: Just the Breakfast,
3$^{rd}$ Subset: Just the Suite.

In some embodiments, the product interactions (405) are simultaneously fed back, and an equilibrium is sought that achieves the maximum expected revenue. In the three product subsets evaluated by the product preference model/module (403), the expected revenues are described as follows (remembering that the supply prediction is a 100% chance of fulfillment for breakfast and 50% chance for the suite).

1$^{st}$ Subset: Both the Breakfast and the Suite:

$$p(1)\times f(p(1),p(2),n=1)+0.5\times p(2)\times f(p(1),p(2),n=2)$$

2$^{nd}$ Subset: Just the Breakfast: $p(1)\times f(p(1),p(2),n=1)$
3$^{rd}$ Subset: Just the Suite: $0.5\times p(2)\times f(p(1),p(2),n=2)$ Performing the optimization, the product/object selection and pricing module (409) determines that the optimal offer (410) contains both products, achieving the maximal expected revenue of $26: Breakfast for an extra $26 and Suite for an extra $192.

Step 8. Provide the offer (410) to the buyer. In some embodiments, the offer (410) is conveyed directly to the buyer (e.g., agent of front desk of the hotel), displayed on an electronic device (computer, PDA, etc.) and/or given over the phone.

Step 9. Record the buyer's response.

In some embodiments, the instant invention involves determining and generating an offer that is an offer of merchandise. In some embodiments, the instant invention involves determining and generating an offer that is an offer of service. In some embodiments, the instant invention involves determining and generating an offer that is an offer of noncommercial nature.

In some embodiments, the instant invention involves determining and generating an offer that is an offer of merchandise where the merchandise is perishable and/or subject to uncertain availability. In some embodiments, the instant invention involves determining and generating an offer that is an offer of merchandise where the merchandise is a hotel room, rental car, airline flight, cruise, golf course, or event ticket.

In some embodiments, the instant invention involves buyer information/data that can include online browsing history and/or clickstream data. In some embodiments, the instant invention involves buyer information/data that can describe a monetary or non-monetary transaction online. In some embodiments, the instant invention involves buyer or seller information/data that can describe a submission of content for display on a web site (e.g., review). In some embodiments, the instant invention involves buyer information/data that can describe an offline transaction.

In some embodiments, the instant invention includes a computer-implemented method for processing transaction-related data that includes at least the following steps of: receiving, by a computer system, seller data about at least one seller that at least include i) at least one seller qualitative characteristic about the at least one seller and at least one seller quantitative characteristic of the at least one seller, or ii) a plurality of seller qualitative characteristics about the at least one seller, or iii) a plurality of seller quantitative characteristics of the at least one seller; receiving, by the computer system, buyer data about at least one buyer that include i) at least one buyer qualitative characteristic about the at least one buyer and at least one buyer quantitative characteristic of the at least one buyer, or ii) a plurality of buyer qualitative characteristics about the at least one seller, or iii) a plurality of buyer quantitative characteristics of the at least one seller; generating, by the computer system, from the seller data, at least one seller profile for the at least one seller where the at least one seller profile comprising at least one seller statistical score calculated based at least in part on the at least one seller qualitative characteristic about the at least one seller or the at least one seller quantitative characteristic of the at least one seller, or both; generating, by the computer system, from the buyer data, at least one buyer profile for the at least one buyer where the at least one buyer profile comprising at least one buyer statistical score calculated based at least in part on the at least one buyer qualitative characteristic about the at least one buyer or the at least one buyer quantitative characteristic of the at least one buyer, or both; receiving, by the computer system, transaction data about at least one current transaction between the at least one seller and the at least one buyer for at least one first offering that includes i) at least one transaction qualitative characteristic about the at least one current transaction, or ii) at least one transaction quantitative characteristic of the at least one current transaction; generating, by the computer system, at least one transaction composite for the at least one current transaction based, at least in part, on: i) the generated particular seller profile, ii) the generated particular buyer profile, and iii) the at least one current transaction; determining, by the computer system, at least one classification rule for each transaction composite class, where each classification rule is determined based at least in part on a plurality of conditions, where the plurality of conditions include i) at least one of the following: the at least one seller qualitative characteristic, or the at least one seller quantitative characteristic, and the at least one seller statistical score, and ii) at least one of the following: the at least one buyer qualitative characteristic, the at least one buyer quantitative characteristic, and the at least one buyer statistical score, and iii) at least one of the following: the at least one transaction qualitative characteristic and the at least one transaction quantitative characteristic; and classifying, by the computer system, the at least one transaction composite into a particular transaction composite class based, at least in part, on comparing the at least one classification rule to: i) the generated at least one seller profile, ii) the generated at least one buyer profile, or iii) the at least one current transaction.

In some embodiments, the inventive methods further include a step of initiating at least one electronic request to at least one electronic source to obtain the seller data about the at least one seller. In some embodiments, the inventive methods further include a step of initiating at least one electronic request to at least one electronic source to obtain the buyer data about the at least one buyer. In some embodiments, the at least one electronic source is a social network source.

In some embodiments, the at least one seller and buyer statistical scores are of type selected from the group of: sum, average, median, mode and count. In some embodiments, the at least one classification rule is based, at least in part, on at least one data mining process. In some embodiments, the at least one data mining process selected from the group of: branching tree-process, clustering process, support vector machine process, neural network process, and random forest process.

In some embodiments, the transaction data comprising information about one of at least one online transaction or at least one offline transaction.

In some embodiments, the instant invention includes a computer-implemented method for determining an offer that include at least the following steps of: determining, by a computer system, a demand for at least one offering from the at least one seller, where the demand is calculated based, at least in part, on: 1) at least one transaction composite, 2) at least one product preference function, where the at least one product preference function is based at least in part on: i) a plurality of offerings, ii) a price of each offering from the plurality of offerings, iii) a transaction composite class of the at least one transaction composite, where the at least one product preference function determines at least one ranked subset of offerings from the plurality of offerings, wherein the at least one ranked subset of offerings identifies a purchasing probability for each offering from the at least one ranked subset of offerings when each offering is being offered with at least one other offering from the at least one ranked subset of offerings, and wherein the at least one product preference function evaluates the purchasing probability of each offering from the at least one ranked subset of offerings based, at least in part, on at least one relationship between the price of each offering in the at least one ranked subset of offerings and the purchasing probability of each offering from the at least one ranked subset of offerings, and 3) at least one price sensitivity function, where the at least one price sensitivity function is based at least in part on: i) the at least one ranked subset from the plurality of offerings, ii) the price and the purchasing probability of each offering from at least one ranked subset, iii) the transaction composite class of the at least one transaction composite, where the at least one price sensitivity function determines the at least one relationship between the price of each offering from the at least one ranked subset of offerings and the purchasing probability of each offering from the at least one ranked subset of offerings; calculating, by the computer system, a supply prediction for the at least one offering, where the supply prediction is determined based at least in part on: i) historical demand data indicating previous fulfillment of the at least one offering, ii) current demand data indicating at least one received but unfulfilled order availability of the at least one offering, and iii) capacity limit for fulfilling orders for the at least one offering; calculating, by the computer system, a revenue prediction, where the revenue prediction determines a maximum expected revenue based at least on the determined demand for the at least one offering and the supply prediction for the at least one offering; and providing at least one offer to at least one potential buyer based, at least in part, on: (1) the determined demand for the at least one offering, (2) the calculated supply prediction, and (3) the calculated revenue prediction.

In some embodiments, the at least one offer comprising an offer of at least one of: merchandise or service. In some embodiments, the merchandise or the service is subject to uncertain availability.

In some embodiments, the instant invention includes a computer system for processing transaction-related data where the computer system includes at least the following components: a) memory having at least one region for storing computer executable program code; and b) at least one processor for executing the computer executable program code stored in the memory, wherein the computer executable program code that at least include the following code: code to receive seller data about at least one seller that include i) at least one seller qualitative characteristic about the at least one seller and at least one seller quantitative characteristic of the at least one seller, or ii) a plurality of seller qualitative characteristics about the at least one seller, or iii) a plurality of seller quantitative characteristics of the at least one seller; code to receive buyer data about at least one buyer that include i) at least one buyer qualitative characteristic about the at least one buyer and at least one buyer quantitative characteristic of the at least one buyer, or ii) a plurality of buyer qualitative characteristics about the at least one seller, or iii) a plurality of buyer quantitative characteristics of the at least one seller; code to generate, from the seller data, at least one seller profile for the at least one seller wherein the at least one seller profile comprising at least one seller statistical score calculated based at least in part on the at least one seller qualitative characteristic about the at least one seller or the at least one seller quantitative characteristic of the at least one seller, or both; code to generate, from the buyer data, at least one buyer profile for the at least one buyer wherein the at least one buyer profile comprising at least one buyer statistical score calculated based at least in part on the at least one buyer qualitative characteristic about the at least one buyer or the at least one buyer quantitative characteristic of the at least one buyer, or both; code to receive transaction data about at least one current transaction between the at least one seller and the at least one buyer for at least one first offering that include i) at least one transaction qualitative characteristic about the at least one current transaction, or ii) at least one transaction quantitative characteristic of the at least one current transaction; code to generate at least one transaction composite for the at least one current transaction based, at least in part, on: i) the generated particular seller profile, ii) the generated particular buyer profile, and iii) the at least one current transaction; code to determine at least one classification rule for each transaction composite class, wherein each classification rule is determined based at least in part on a plurality of conditions, wherein the plurality of conditions at least include: i) at least one of the following: the at least one seller qualitative characteristic, or the at least one seller quantitative characteristic, and the at least one seller statistical score, and ii) at least one of the following: the at least one buyer qualitative characteristic, the at least one buyer quantitative characteristic, and the at least one buyer statistical score, and iii) at least one of the following: the at least one transaction qualitative characteristic and the at least one transaction quantitative characteristic; and code to classify the at least one transaction composite into a particular transaction composite class based, at least in part, on comparing the at least one classification rule to: i) the generated at least one seller profile, ii) the generated at least one buyer profile, or iii) the at least one current transaction.

In some embodiments, the instant invention includes a computer system for determining an offer that includes at least the following components: a) memory having at least one region for storing computer executable program code; and b) at least one processor for executing the computer executable program code stored in the memory, where the computer executable program code at least include the following code: code to determine a demand for at least one offering from the at least one seller, wherein the demand is calculated based, at least in part, on: 1) at least one transaction composite, 2) at least one product preference function, wherein the at least one product preference function is based at least in part on: i) a plurality of offerings, ii) a price of each offering from the plurality of offerings, iii) a transaction composite class of the at least one transaction composite, wherein the at least one product preference function determines at least one ranked subset of offerings from the plurality of offerings, wherein the at least one ranked subset of offerings identifies a purchasing probability for each offering from the at least one ranked subset of offerings when each offering is being offered with at least one other offering from the at least one ranked subset of offerings, and wherein the at least one product preference function evaluates the purchasing probability of each offering from the at least one ranked subset of offerings based, at least in part, on at least one relationship between the price of each offering in the at least one ranked subset of offerings and the purchasing probability of each offering from the at least one ranked subset of offerings, and 3) at least one price sensitivity function, wherein the at least one price sensitivity function is based at least in part on: i) the at least one ranked subset from the plurality of offerings, ii) the price and the purchasing probability of each offering from at least one ranked subset, iii) the transaction composite class of the at least one transaction composite, wherein the at least one price sensitivity function determines the at least one relationship between the price of each offering from the at least one ranked subset of offerings and the purchasing probability of each offering from the at least one ranked subset of offerings; code to calculate a supply prediction for the at least one offering, wherein the supply prediction is determined based at least in part on: i) historical demand data indicating previous fulfillment of the at least one offering, ii) current demand data indicating at least one received but unfulfilled order availability of the at least one offering, and iii) capacity limit for fulfilling orders for the at least one offering; code to calculate a revenue prediction, wherein the revenue prediction determines a maximum expected revenue based at least on the determined demand for the at least one offering and the supply prediction for the at least one offering; and code to provide at least one offer to at least one potential buyer based, at least in part, on: (1) the determined demand for the at least one offering, (2) the calculated supply prediction, and (3) the calculated revenue prediction.

In some embodiments, the instant invention involves seller information/data that can describe a monetary or non-monetary transaction online. In some embodiments, the instant invention involves seller information/data that can describe a submission, by separate actor, of content, related to the provider, for display on a web site. In some embodiments, the instant invention involves seller information/data that includes information about availability of one or more of the seller's products, services, and/or other types of offerings (e.g., rewards, miles, non-monetary, etc.).

In some embodiments, the price sensitivity model/module/function (404) includes an elasticity function that characterizes the relationships between a buyer, a set of objects (e.g., products, service, other types of offerings, etc.) from a set of sellers, and the probabilities the buyer will transact any subset of the objects for a price.

In some embodiments, the product preference module/function (403) includes a preference function that ranks, with respect to a user, a set of objects (e.g., products, service, other types of offerings, etc.) with associated prices, in order of the probability of transacting the object at the price.

In some embodiments, the product/object selection and pricing optimization model/module/function (409) includes a convolution function (e.g., P-E convolution, etc.) that causes the elasticity function of the price sensitivity model/module/function (404) and the preference function of product preference module/function (403) to be co-dependent such that object preferences depend on prices and prices depends on object preferences.

In some embodiments, the product/object selection and pricing optimization model/module/function (409) includes a solver function that identifies an equilibrium in the co-dependence of prices and object preferences.

In some embodiments, the product/object selection and pricing optimization model/module/function (409) includes a learning mechanism that improves the predictive accuracy of the models. In some embodiments, the learning mechanism operates by extracting, from time to time, new predictive information from new (or updated) user information.

In some embodiments, the instant invention stores all received information (buyer's, seller's, transaction's, availability, etc.) and combines with any new (updated) information (buyer's, seller's, transaction's, availability, etc.) received in the future to provide a future offer related to the same buyer and seller or to a different buyer and seller.

In some embodiments, the product/object selection and pricing optimization model/module/function (409) includes a lattice-domained function that characterizes a buyer's history with a seller and measures the change in the probability that a user transacts an object with the seller at a later time.

In some embodiments, the product/object selection and pricing optimization model/module/function (409) selects the offer (410) by selecting an object or an assortment of objects for the seller to offer to the buyer.

In some embodiments, the product/object selection and pricing optimization model/module/function (409) selects the offer (410) by determining the prices for each of the objects in the assortment of objects.

In some embodiments, the product/object selection and pricing optimization model/module/function (409) selects the offer (410) by determining a rank for each of the objects in said assortment of objects.

While a number of embodiments of the present invention have been described, it is understood that these embodiments are illustrative only, and not restrictive, and that many modifications may become apparent to those of ordinary skill in the art. For example, certain methods may have been described herein as being "computer implementable" or "computer implemented". In this regard, it is noted that while such methods can be implemented using a computer, the methods do not necessarily have to be implemented using a computer. Also, to the extent that such methods are implemented using a computer, not every step must necessarily be implemented using a computer. Further still, the various steps may be carried out in any desired order (and any desired steps may be added and/or any desired steps may be eliminated).

What is claimed is:

1. A computer-implemented method for processing transaction-related data, comprising:
   receiving, by a computer system, transaction data for at least one current transaction between at least one seller and at least one buyer for at least one first offering;
      wherein the transaction data for the at least one current transaction comprises:
         i) at least one transaction qualitative characteristic about the at least one current transaction, or
         ii) at least one transaction quantitative characteristic of the at least one current transaction;
   receiving, by the computer system, at least one seller profile for the at least one seller;
      wherein the at least one seller profile is independent from the transaction data for the at least one current transaction;
      wherein the at least one seller profile is based at least in part on seller data about the at least one seller, wherein the seller data comprises:
         i) at least one seller qualitative characteristic about the at least one seller and at least one seller quantitative characteristic of the at least one seller, or
         ii) a plurality of seller qualitative characteristics about the at least one seller, or
         iii) a plurality of seller quantitative characteristics of the at least one seller;
      wherein the at least one seller profile comprises:
         at least one seller statistical score calculated based at least in part on the at least one seller qualitative characteristic about the at least one seller or the at least one seller quantitative characteristic of the at least one seller, or both, and
         at least one of the following: the at least one seller qualitative characteristic and the at least one seller quantitative characteristic;
   receiving, by the computer system, at least one buyer profile for the at least one buyer;
      wherein the at least one buyer profile is independent from the transaction data for the at least one current transaction;
      wherein the at least one buyer profile is based at least in part on buyer data about at least one buyer, wherein the buyer data comprises:
         i) at least one buyer qualitative characteristic about the at least one buyer and at least one buyer quantitative characteristic of the at least one buyer, or
         ii) a plurality of buyer qualitative characteristics about the at least one buyer, or
         iii) a plurality of buyer quantitative characteristics of the at least one buyer;
      wherein the at least one buyer profile comprises:
         at least one buyer statistical score calculated based at least in part on the at least one buyer qualitative characteristic about the at least one buyer or the at least one buyer quantitative characteristic of the at least one buyer, or both, and
         at least one of the following: the at least one buyer qualitative characteristic and the at least one buyer quantitative characteristic;
   generating, by the computer system, at least one transaction composite for the at least one current transaction, wherein the at least one at least one transaction composite comprises:
      i) the at least one seller profile,
      ii) the at least one buyer profile, and
      iii) the transaction data for the at least one current transaction;
   determining, by the computer system, at least one transaction composite class based at least in part on at least one classification rule,
      wherein the at least one classification rule is determined based at least in part on a plurality of conditions, wherein the plurality of conditions comprise:
         i) at least one of the following: the at least one seller qualitative characteristic, the at least one seller quantitative characteristic, and the at least one seller statistical score, and
         ii) at least one of the following: the at least one buyer qualitative characteristic, the at least one buyer quantitative characteristic, and the at least one buyer statistical score, and
         iii) at least one of the following: the at least one transaction qualitative characteristic and the at least one transaction quantitative characteristic; and
   classifying, by the computer system, the at least one transaction composite into the at least one transaction composite class based, at least in part, on comparing the at least one classification rule to:
      i) the at least one seller profile,
      ii) the at least one buyer profile, and
      iii) the transaction data for at least one current transaction.

2. The method of claim 1, wherein the method further comprises initiating at least one electronic request to at least one electronic source to obtain the seller data about the at least one seller and generating, by the computer system, from the seller data, at least one seller profile.

3. The method of claim 1, wherein the method further comprises initiating at least one electronic request to at least one electronic source to obtain the buyer data about the at least one buyer and generating, by the computer system, from the buyer data, at least one buyer profile.

4. The method of claim 3, wherein the at least one electronic source is a social network source.

5. The method of claim 1, wherein the at least one seller and buyer statistical scores are of type selected from the group of: sum, average, median, mode and count.

6. The method of claim 1, wherein the at least one classification rule is based, at least in part, on at least one data mining process.

7. The method of claim 6, wherein the at least one data mining process selected from the group of: branching tree-process, clustering process, support vector machine process, neural network process, and random forest process.

8. The method of claim 1, wherein the buyer data comprises online browsing history or clickstream data.

9. The method of claim 1, wherein the transaction data comprises information about at least one online transaction, at least one offline transaction, or both.

10. The method of claim 1, wherein the at least one seller statistical score utilizes the seller data without associating the seller data with a particular buyer of the at least one seller and without associating the seller data with a particular transaction between the particular buyer and the at least one seller.

11. The method of claim 1, wherein the at least one current transaction is an expression of interest by the at least one buyer to transact with at least one seller for at least one offering.

12. A computer system for processing transaction-related data, comprising:
- a) memory having at least one region for storing computer executable program code; and
- b) at least one processor for executing the computer executable program code stored in the memory, wherein the computer executable program code comprising:
- code to receive transaction data for at least one current transaction between at least one seller and at least one buyer for at least one first offering;
  - wherein the transaction data for the at least one current transaction comprises:
    - i) at least one transaction qualitative characteristic about the at least one current transaction, or
    - ii) at least one transaction quantitative characteristic of the at least one current transaction;
- code to receive at least one seller profile for the at least one seller;
  - wherein the at least one seller profile is independent from the transaction data for the at least one current transaction;
  - wherein the at least one seller profile is based at least in part on seller data about at least one seller, comprising:
    - i) at least one seller qualitative characteristic about the at least one seller and at least one seller quantitative characteristic of the at least one seller, or
    - ii) a plurality of seller qualitative characteristics about the at least one seller, or
    - iii) a plurality of seller quantitative characteristics of the at least one seller;
  - wherein the at least one seller profile comprises:
    - at least one seller statistical score calculated based at least in part on the at least one seller qualitative characteristic about the at least one seller or the at least one seller quantitative characteristic of the at least one seller, or both, and
    - at least one of the following: the at least one seller qualitative characteristic and the at least one seller quantitative characteristic;
- code to receive at least one buyer profile for the at least one buyer;
  - wherein the at least one buyer profile is independent from the transaction data for the at least one current transaction;
  - wherein the at least one buyer profile is based at least in part on buyer data about at least one buyer, comprising
    - i) at least one buyer qualitative characteristic about the at least one buyer and at least one buyer quantitative characteristic of the at least one buyer, or
    - ii) a plurality of buyer qualitative characteristics about the at least one buyer, or
    - iii) a plurality of buyer quantitative characteristics of the at least one buyer;
  - wherein the at least one buyer profile comprises:
    - at least one buyer statistical score calculated based at least in part on the at least one buyer qualitative characteristic about the at least one buyer or the at least one buyer quantitative characteristic of the at least one buyer, or both, and
    - at least one of the following: the at least one buyer qualitative characteristic and the at least one buyer quantitative characteristic;
- code to generate at least one transaction composite for the at least one current transaction, wherein the at least one at least one transaction composite comprises:
  - i) the at least one seller profile,
  - ii) the at least one buyer profile, and
  - iii) the transaction data for the at least one current transaction;
- code to determine at least one transaction composite class based at least in part on at least one classification rule, wherein the at least one classification rule is determined based at least in part on a plurality of conditions,
  - wherein the plurality of conditions comprise:
    - i) at least one of the following: the at least one seller qualitative characteristic, the at least one seller quantitative characteristic, and the at least one seller statistical score, and
    - ii) at least one of the following: the at least one buyer qualitative characteristic, the at least one buyer quantitative characteristic, and the at least one buyer statistical score, and
    - iii) at least one of the following: the at least one transaction qualitative characteristic and the at least one transaction quantitative characteristic; and
- code to classify the at least one transaction composite into the at least one transaction composite class based, at least in part, on comparing the at least one classification rule to:
  - i) the at least one seller profile,
  - ii) the at least one buyer profile, and
  - iii) the at least one current transaction.

13. The system of claim 12, wherein the system further comprises code to initiate at least one electronic request to at least one electronic source to obtain the seller data about the at least one seller and code to generate, from the seller data, at least one seller profile.

14. The system of claim 12, wherein the system further comprises code to initiate at least one electronic request to at least one electronic source to obtain the buyer data about the at least one buyer and code to generate, from the buyer data, at least one buyer profile.

15. The system of claim 14, wherein the at least one electronic source is a social network source.

16. The system of claim 12, wherein the at least one seller and buyer statistical scores are of type selected from the group of: sum, average, median, mode and count.

17. The system of claim 16, wherein the at least one classification rule is based, at least in part, on at least one data mining process.

18. The system of claim 17, wherein the at least one data mining process selected from the group of: branching tree-process, clustering process, support vector machine process, neural network process, and random forest process.

19. The system of claim 12, wherein the buyer data comprises online browsing history or clickstream data.

20. The system of claim 12, wherein the at least one seller statistical score utilizes the seller data without associating the seller data with a particular buyer of the at least one seller and without associating the seller data with a particular transaction between the particular buyer and the at least one seller.

21. The system of claim 12, wherein the at least one current transaction is an expression of interest by the at least one buyer to transact with at least one seller for at least one offering.

22. The system of claim 12, wherein the transaction data comprises information about at least one online transaction, at least one offline transaction, or both.

\* \* \* \* \*